(12) United States Patent
Sasaki et al.

(10) Patent No.: US 10,543,767 B2
(45) Date of Patent: Jan. 28, 2020

(54) CUSHION PAN AND VEHICLE SEAT

(71) Applicant: NHK SPRING CO., LTD., Yokohama-shi (JP)

(72) Inventors: Yoshitaka Sasaki, Yokohama (JP); Shunichirou Osa, Yokohama (JP); Akihiro Hayashi, Yokohama (JP); Hiroaki Takeuchi, Yokohama (JP); Kazuki Hirao, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 13 days.

(21) Appl. No.: 15/785,274

(22) Filed: Oct. 16, 2017

(65) Prior Publication Data

US 2018/0111531 A1 Apr. 26, 2018

(30) Foreign Application Priority Data

Oct. 21, 2016 (JP) .................................. 2016-207069

(51) Int. Cl.
*B60N 2/68* (2006.01)
*A47C 7/18* (2006.01)
*B60N 2/70* (2006.01)

(52) U.S. Cl.
CPC .............. *B60N 2/686* (2013.01); *A47C 7/185* (2013.01); *B60N 2/68* (2013.01); *B60N 2/7094* (2013.01)

(58) Field of Classification Search
CPC ................................ B06N 2/686; A47C 7/185
USPC ........................... 297/452.18, 452.38, 452.55
See application file for complete search history.

(56) References Cited

U.S. PATENT DOCUMENTS

| 5,857,750 | A | * | 1/1999 | Kashiwamura | A47C 7/14 297/452.55 |
| 6,439,666 | B1 | * | 8/2002 | Kimura | B60N 2/686 297/452.55 |
| 8,251,425 | B2 | * | 8/2012 | Jungert | B60N 2/686 297/452.18 |
| 2009/0134686 | A1 | * | 5/2009 | Naito | B60N 2/68 297/452.55 |
| 2009/0212611 | A1 | * | 8/2009 | Gloriosa | B60N 2/06 297/217.3 |
| 2011/0148173 | A1 | * | 6/2011 | Westerink | B60N 2/24 297/452.18 |
| 2016/0144756 | A1 | * | 5/2016 | Ito | B60N 2/686 297/452.49 |
| 2016/0236600 | A1 | * | 8/2016 | Citron | B60N 2/686 |
| 2016/0311343 | A1 | * | 10/2016 | Mildner | B60N 2/0705 |

FOREIGN PATENT DOCUMENTS

JP H11-75984 3/1999

* cited by examiner

*Primary Examiner* — Kyle R Grabowski
(74) *Attorney, Agent, or Firm* — Knobbe, Martens, Olson & Bear, LLP (57) ABSTRACT

A cushion pan for a seat cushion is formed from a metal sheet and the cushion pan includes: an outer frame section that is formed in a frame shape in a seat plan view, a pair of mutually opposing sides of the outer frame section each including a horizontal portion with a respective thickness direction along a seat up-down direction; a pair of side plate portions that extend toward one side in the seat up-down direction from facing end portions of the pair of horizontal portions; and a plate spring portion having a flat plate shape bridging between ends of the pair of side plate portions on an opposite side of the side plate portions from the pair of horizontal portions.

4 Claims, 14 Drawing Sheets

CUSHION PAN AND VEHICLE SEAT

CROSS-REFERENCE TO RELATED APPLICATION

This application is based on and claims priority under 35 USC 119 from Japanese Patent Application No. 2016-207069 filed on Oct. 21, 2016, which is incorporated by reference herein.

BACKGROUND

Technical Field

The present disclosure relates to a cushion pan and a vehicle seat.

BACKGROUND ART

Related Art

Japanese Patent Application Laid-Open (JP-A) No. H11-75984 describes a seat pad support body (cushion pan) that is overall formed as a single body from long glass fiber-reinforced polypropylene. Mutually opposing cutout grooves are formed in the seat pad support body, and the region lying between the two cutout grooves configures an up-down swing section. A flexible portion with a substantially U-shaped profile in cross-section or a substantially W-shaped profile in cross-section is formed at each of the two ends of the up-down swing section, and configuration is such that the up-down swing section swings downward due to the two flexible portions flexing when the load from a seated person is imparted downward. The ride comfort for the seated person is thereby improved. The seat pad support body may, for example, be formed as a single body by pressing a metal sheet, such as a sheet of spring steel.

However, if the seat pad support body of the above configuration is pressed from a metal sheet, such as a sheet of spring steel, then the flexible portion becomes substantially inflexible due to the section modulus of the flexible portion being increased. Moreover, manufacture is complicated due to poor formability when pressing the flexible portions into a substantially U-shaped profile in cross-section or a substantially W-shaped profile in cross-section. In particular, it is difficult to press the flexible portions into a substantially U-shaped profile in cross-section or a substantially W-shaped profile in cross-section in cases in which the metal sheet is spring steel.

SUMMARY

An aspect of the present disclosure is a cushion pan for a seat cushion. The cushion pan is formed from a metal sheet and the cushion pan comprises: an outer frame section that is formed in a frame shape in a seat plan view, a pair of mutually opposing sides of the outer frame section each including a horizontal portion with a respective thickness direction along a seat up-down direction; a pair of side plate portions that extend toward one side in the seat up-down direction from facing end portions of the pair of horizontal portions; and a plate spring portion having a flat plate shape bridging between ends of the pair of side plate portions on an opposite side of the side plate portions from the pair of horizontal portions.

DESCRIPTION OF EMBODIMENTS

Description follows regarding a cushion pan 30 and a vehicle seat 10 according to an exemplary embodiment of the present disclosure, with reference to FIG. 1 to FIG. 6. Note that in the drawings, the arrow FR, the arrow UP, and the arrow LH respectively indicate forward, upward, and leftward of the vehicle seat 10, as appropriate. When employed in the following description, unless specifically stated otherwise, front, rear, left, right, up, and down directions indicate directions with respect to the vehicle seat 10.

Overall Configuration of Vehicle Seat 10

Figure 1:
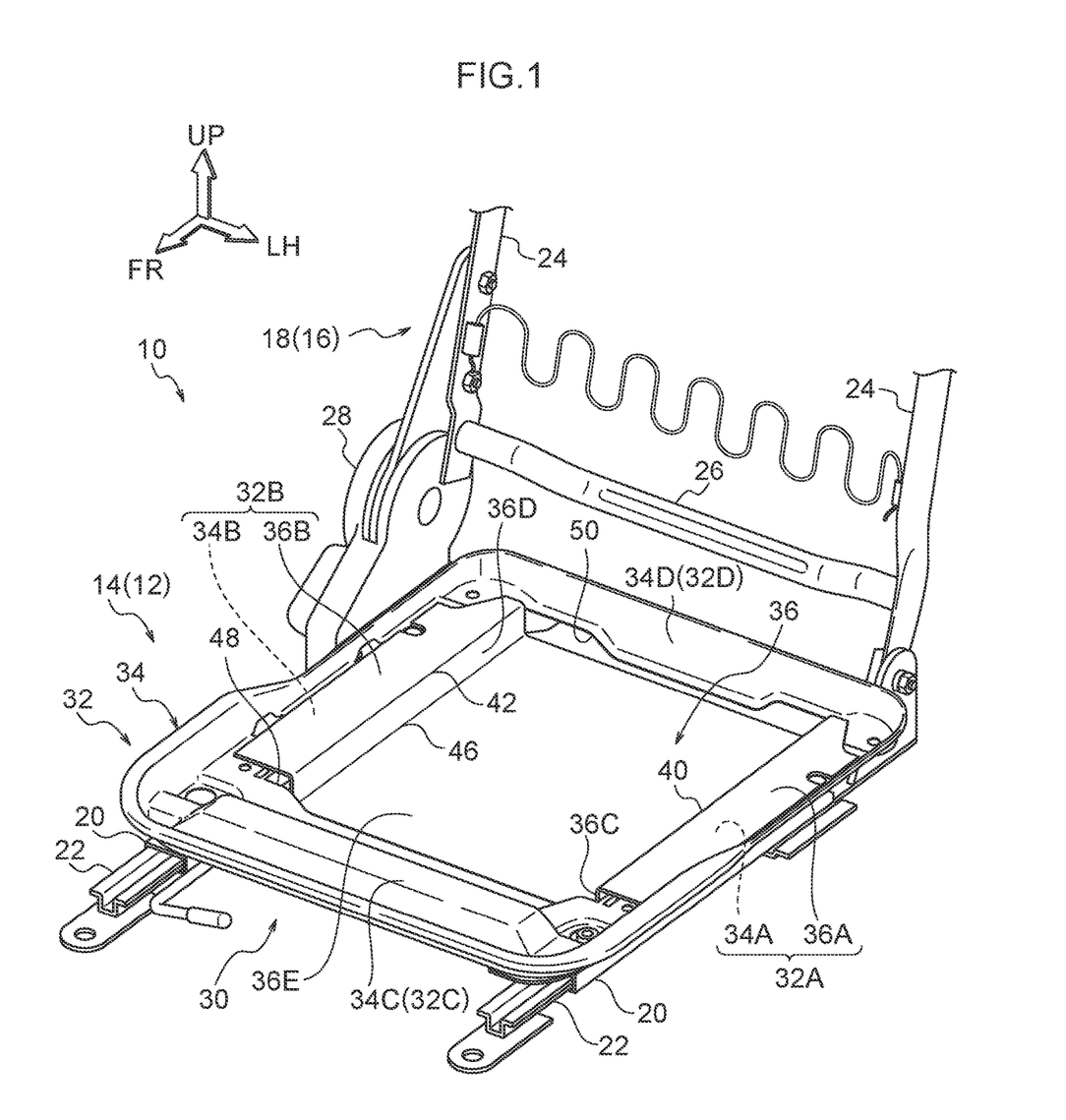
FIG. 1 is a perspective view illustrating a frame of a vehicle seat according to an exemplary embodiment of the present disclosure.
Figure 2:
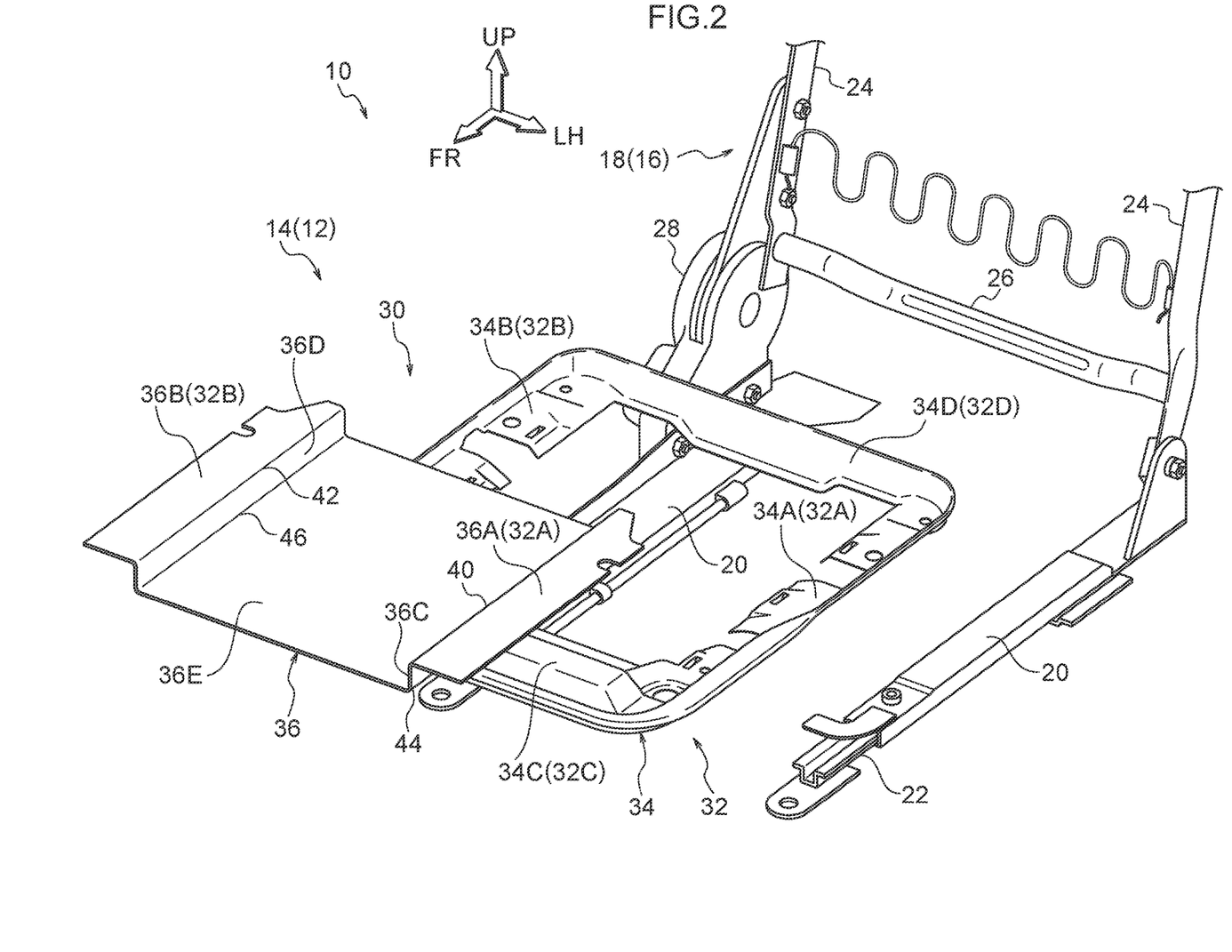
FIG. 2 is an exploded perspective view corresponding to FIG. 1, illustrating an exploded state of a seat cushion frame of the same vehicle seat.

As illustrated in FIG. 1 and FIG. 2, the vehicle seat 10 according to the present exemplary embodiment includes a seat cushion frame 14 that forms the framework for a seat cushion 12, and a seatback frame 18 that forms the framework for a seatback 16. A pad member covered by a covering is attached to each of the seat cushion frame 14 and the seatback frame 18.

The seat cushion frame 14 includes a left and right pair of side frames 20 arranged at portions on the left and right sides of the seat cushion 12, and a cushion pan 30 supported from the vehicle lower side by the left and right side frames 20.

The left and right side frames 20 are, for example, formed in an elongated shape from a metal sheet, and are disposed with their lengths along the seat front-rear direction. The cushion pan 30 is formed by pressing a metal sheet, and is formed in a substantially rectangular shape as viewed in a seat plan view. The two seat width direction ends of the cushion pan 30 are fixed to the left and right side frames 20 by bolt fasteners or the like. Details are given later regarding the cushion pan 30.

The left and right side frames 20 of the seat cushion frame 14 are coupled to a floor of a vehicle body through a left and right pair of slide rails 22. These slide rails 22 are configure a known sliding mechanism, rendering the position of the seat cushion frame 14 adjustable relative to the vehicle body in the front-rear direction.

The seatback frame 18 includes a left and right pair of side frames 24 disposed at the left and right side of the seatback 16 and extending in the up-down direction (height direction) of the seatback 16, an upper frame that bridges between upper end portions of the left and right side frames 24, and a lower frame 26 that bridges between lower end portions of the left and right side frames 24. The lower end portions of the left and right side frames 24 are coupled to the left and right side frames 20 of the seat cushion frame 14 through a known reclining mechanism 28. The reclining angle of the seatback frame 18 is thereby adjustable with respect to the seat cushion frame 14.

Cushion Pan 30 Configuration

As illustrated in FIG. 1 to FIG. 6, the cushion pan 30 according to the present exemplary embodiment has a configuration in which a frame member 34 and a plate spring member 36 are joined together. The frame member 34 and the plate spring member 36 are each formed by pressing metal sheets, such as sheets of spring steel. The frame member 34 is formed in a frame shape in seat plan view, and the outer periphery of the frame member 34 is bent toward the seat upper side. The frame member 34 is a single body including a left and right pair of sides 34A, 34B mutually opposing each other along the seat left-right direction (the seat width direction), and a front and rear pair of sides 34C, 34D mutually opposing each other along the seat front-rear direction. The left and right sides 34A, 34B extend in the seat front-rear direction, and the front and rear sides 34C, 34D extend in the seat left-right direction. The left and right sides 34A, 34B corresponds to the "pair of sides configuring the frame member" according to the present disclosure.

Figure 3:
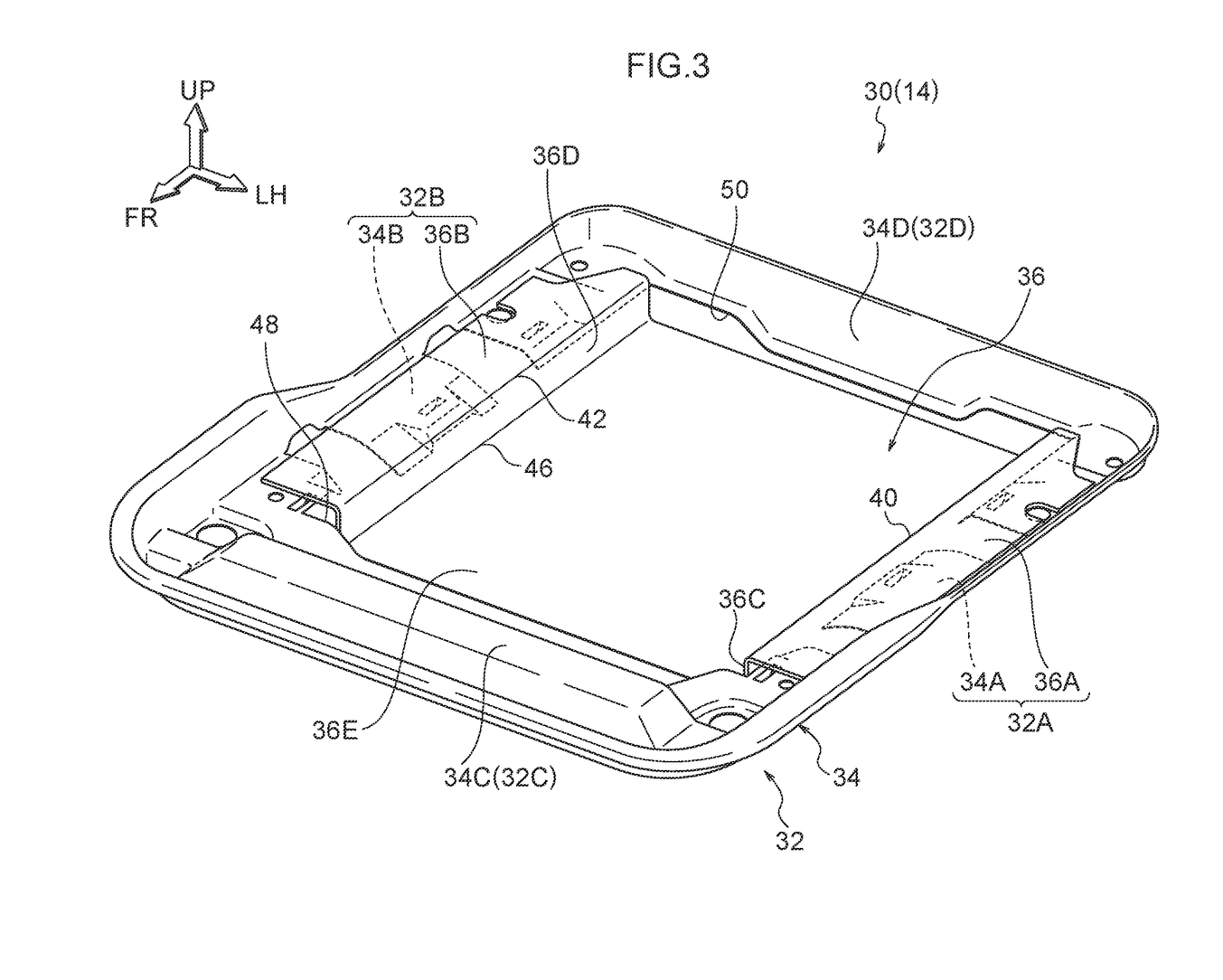
FIG. 3 is a perspective view illustrating a cushion pan including the same seat cushion frame, in a state as viewed from the seat front side, diagonally above and to the left.
Figure 4:
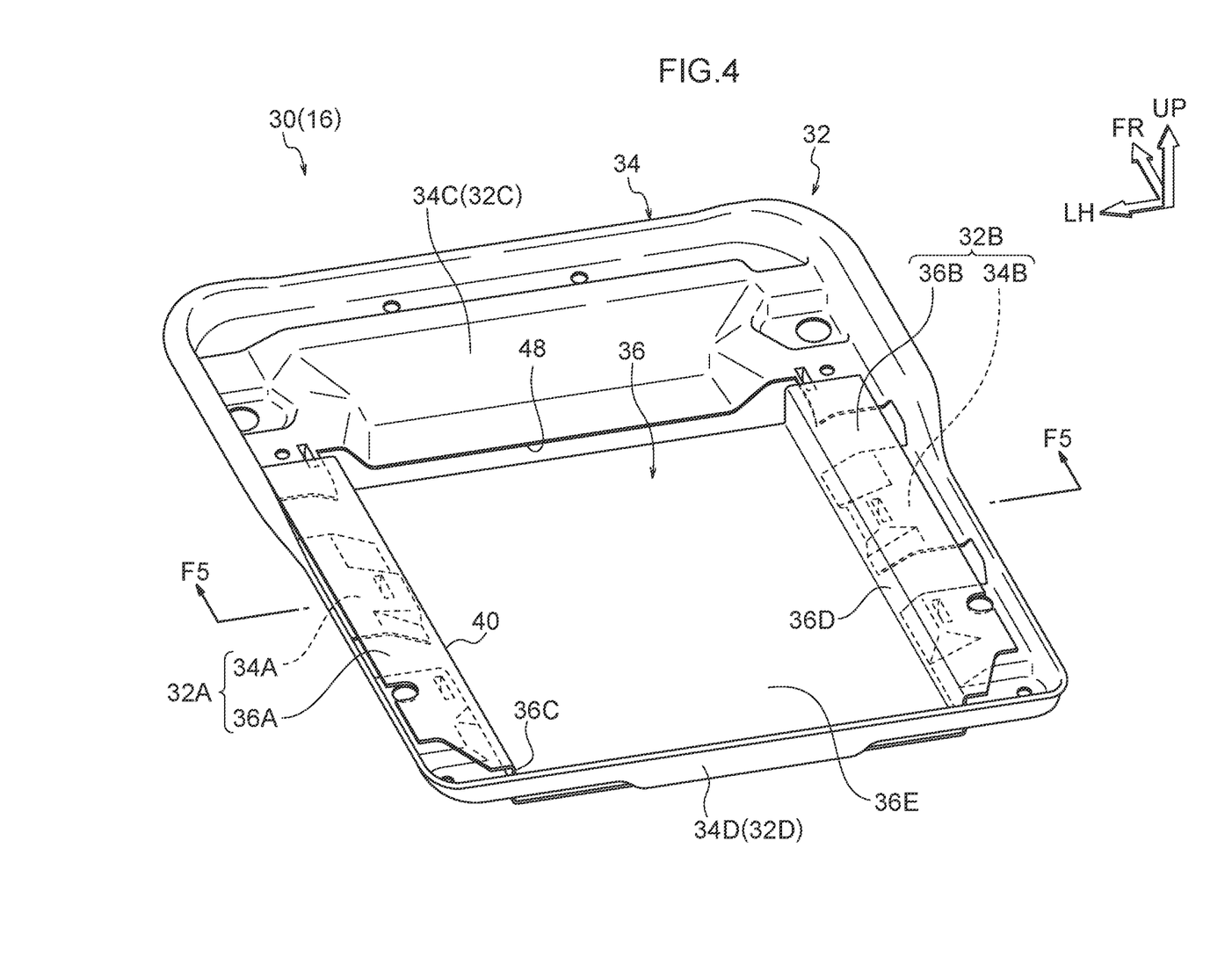
FIG. 4 is a perspective view illustrating the same cushion pan, in a state as viewed from the seat rear side, diagonally above and to the left.
Figure 5:
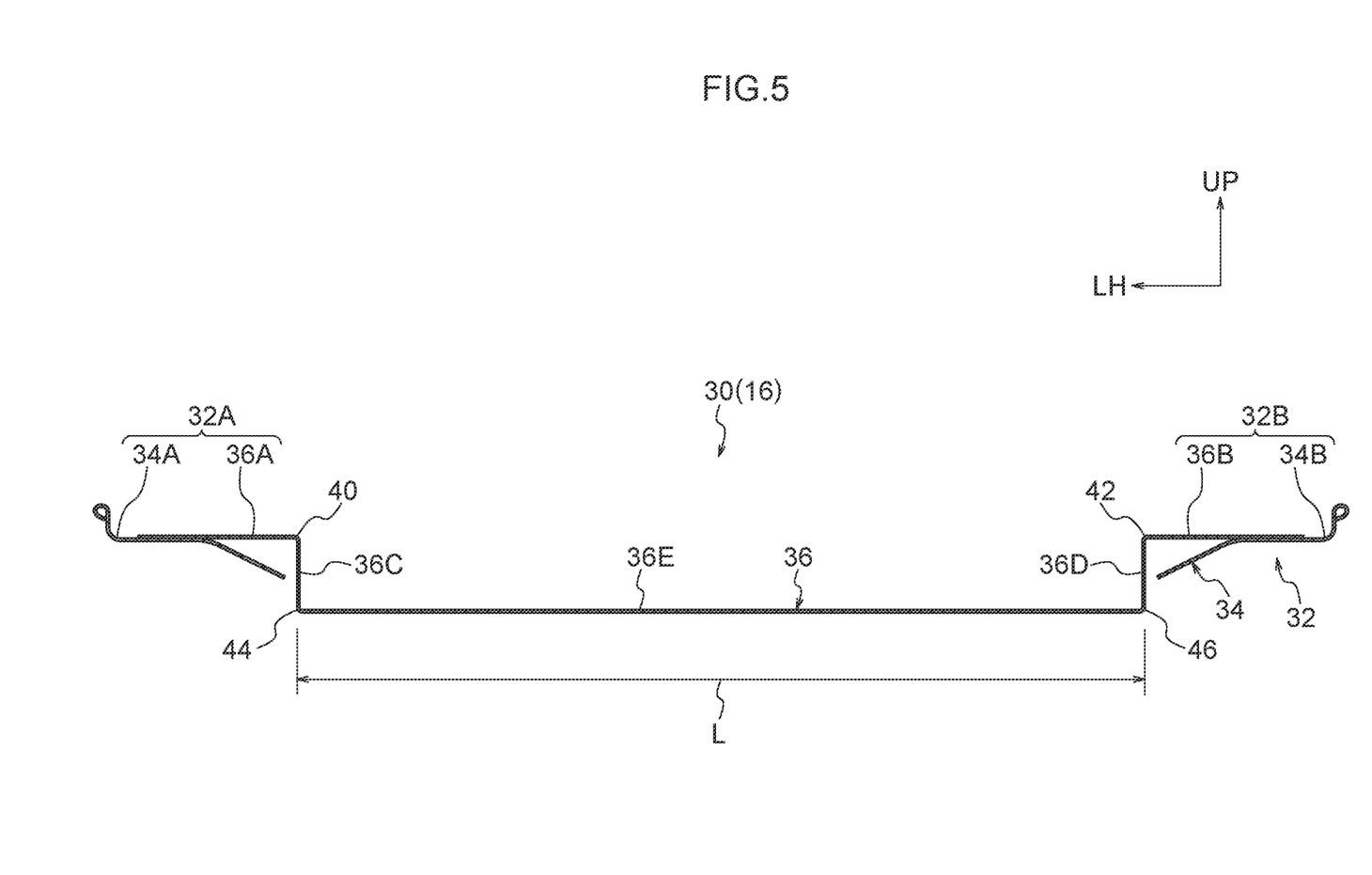
FIG. 5 is an enlarged cross-section illustrating an enlarged cross-section taken along line F5-F5 of FIG. 4.

The plate spring member 36 is formed by pressing a metal sheet so as to have a hat-shaped profile in cross-section, and is a single body including a pair of horizontal portions (flanges) 36A, 36B, a pair of side plate portions 36C, 36D, and a plate spring portion (horizontal sheet portion) 36E. The pair of horizontal portions 36A, 36B are formed in flat plate shapes with their sheet thickness directions along the seat up-down direction. The pair of horizontal portions 36A, 36B are formed, in seat plan view, in elongated rectangular shapes having their lengths along the seat front-rear direction. The horizontal portions 36A, 36B are overlaid from the seat upper side onto the left and right sides 34A, 34B configuring the frame member 34, and are joined to the left and right sides 34A, 34B by a method such as crimping or welding.

The pair of side plate portions 36C, 36D extend from the facing end portions of the pair of horizontal portions 36A, 36B toward the seat lower side, and, when viewed along the seat left-right direction, are formed in elongated rectangular shapes with their lengths in the seat front-rear direction. The side plate portions 36C, 36D are formed in flat plate shapes with their sheet thickness directions along the seat left-right direction, and extend in the seat up-down direction as viewed from a direction (herein, the seat front-rear direction) orthogonal to the opposing direction of the pair of horizontal portions 36A, 36B (this being the seat left-right direction herein) and to the seat up-down direction (see FIG. 5 and FIG. 6). Namely, the pair of side plate portions 36C, 36D extend vertically or substantially vertically when viewed along the seat front-rear direction.

The plate spring portion 36E bridges between the ends (herein, the lower ends) on the opposite side of the pair of side plate portions 36C, 36D to the pair of horizontal portions 36A, 36B. The plate spring portion 36E is formed in a flat plate shape having its sheet thickness direction along the seat up-down direction, and is formed in a rectangular shape (substantially square shape) in seat plan view. Due to its own ductility, the plate spring portion 36E has a configuration flexible in the direction of action of the load from a seated person.

In the plate spring member 36 configured as described above, there is a single respective bend 40, 42 configured between the pair of horizontal portions 36A, 36B and the pair of side plate portions 36C, 36D, and there is single respective bend 44, 46 configured between the pair of side plate portions 36C, 36D and the plate spring portion 36E. The bends 40, 42, 44, 46 extend in the seat front-rear direction.

The cushion pan 30 configured as described above by joining the frame member 34 and the plate spring member 36 together is overall formed in a shallow, bottomed angular tray shape (angular saucer shape), and includes an outer frame section 32 formed in a frame shape in seat plan view. The outer frame section 32 includes a pair of sides 32A, 32B mutually opposing each other in the seat left-right direction, and a pair of sides 32C, 32D mutually opposing each other in the seat front-rear direction. The pair of sides 32C, 32D are configured by the pair of sides 34C, 34D configuring the frame member 34. The pair of sides 32A, 32B are configured by the joining together the pair of sides 34A, 34B configuring the frame member 34 and the pair of horizontal portions 36A, 36B configuring the plate spring member 36. The sides 32A, 32B are mounted on the upper faces of the left and right side frames 20 described above, and are fixed to the left and right side frames 20 by a method such as bolt fastening.

In the cushion pan 30, respective slits 48, 50 are formed between the front and rear pair of sides 32A, 32B configuring the frame member 34, and the plate spring member 36. The slits 48, 50 extend along the seat left-right direction, and are arranged so as to lie in a row parallel to the seat front-rear direction. Moreover, an area toward the center of the cushion pan 30 configures the plate spring portion 36E, in such a configuration that a central portion of the plate spring portion 36E is positioned below the hip points of an occupant seated on the seat cushion 12.

Operation and Advantageous Effects

Description follows regarding the operation and advantageous effects of the present exemplary embodiment.

In the vehicle seat 10 configured as described above, the cushion pan 30 is formed from a metal sheet and includes the outer frame section 32 formed in a frame shape in seat plan view. The mutually opposing pair of sides 32A, 32B of the outer frame section 32 include the horizontal portions 36A, 36B each having their sheet thickness direction along the seat up-down direction. The pair of side plate portions 36C, 36D extend toward the seat lower side from the facing end portions of the pair of horizontal portions 36A, 36B, and the flat plate shaped plate spring portion 36E bridges between the lower end portions of the pair of side plate portions 36C, 36D.

Figure 6:
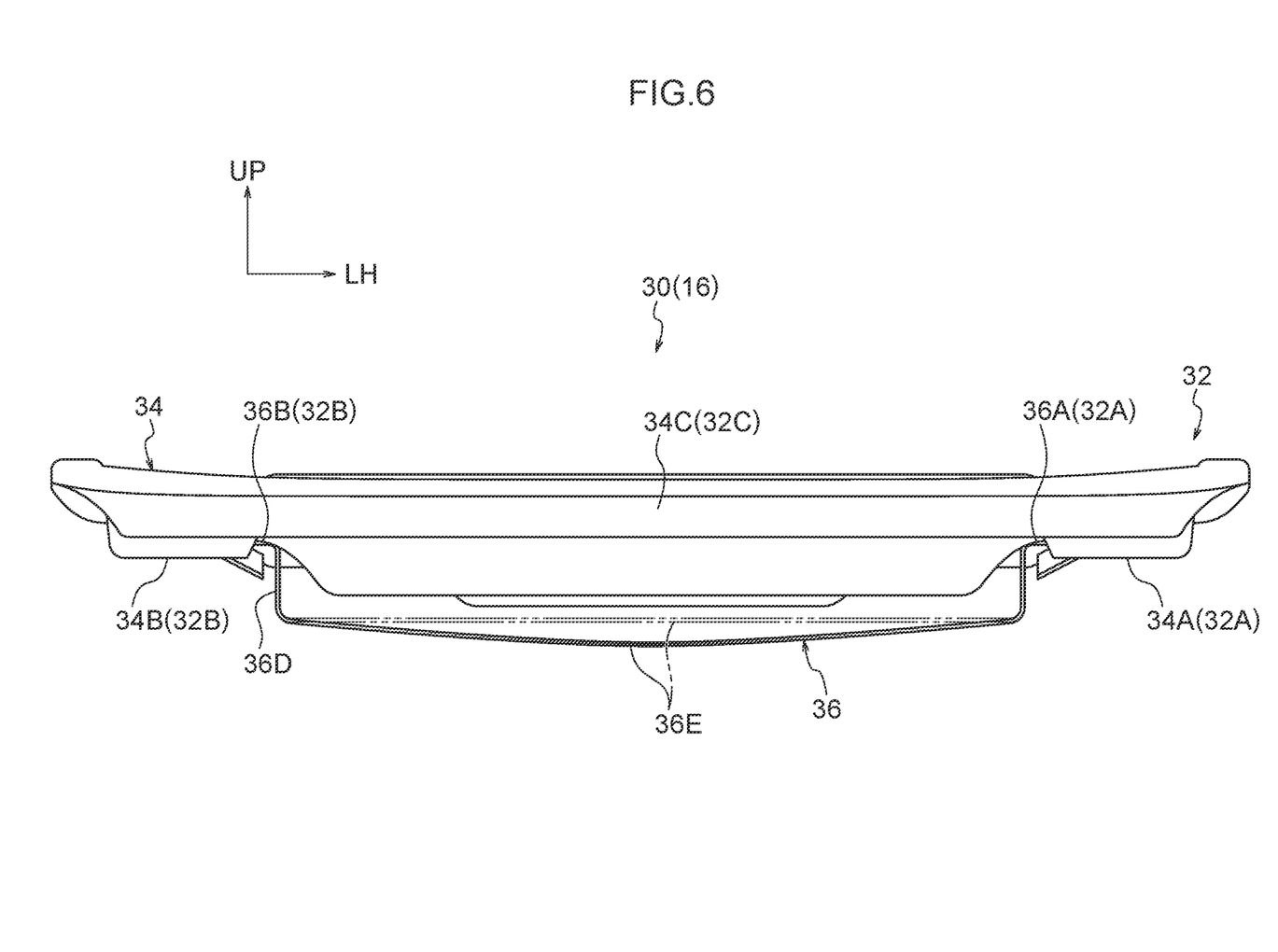
FIG. 6 is a front view illustrating the same cushion pan as viewed from the seat front side, in a state in which downward load has been imparted to a plate spring portion.

In the cushion pan 30, the plate spring portion 36E can be made to flex due to the ductility of the plate spring portion 36E when load from a seated person is imparted downward (see FIG. 6). This enables good ride comfort of a seated person to be secured. Note that FIG. 6 uses computer analysis to illustrate a state in which downward load has been applied to the plate spring portion 36E. In FIG. 6, the magnitude of stress arising is illustrated using a grey scale, with darker locations indicating greater stress.

Moreover, in the cushion pan 30, it is sufficient to press the locations corresponding to the pair of horizontal portions 36A, 36B, the pair of side plate portions 36C, 36D, and the plate spring portion 36E into hat-shaped profile in cross-section, and there is no need to form flexible portions with a substantially U-shaped profile in cross-section or a substantially W-shaped profile in cross-section. Press-manufacture is accordingly easy.

Furthermore, in the cushion pan 30, the pair of side plate portions 36C, 36D configured as described above extend toward the seat lower side from the facing end portions of the pair of horizontal portions 36A, 36B, and the plate spring portion 36E bridges between the lower end portions of the pair of side plate portions 36C, 36D. Thus, tensile force acts on the pair of side plate portions 36C, 36D when load from a seated person is imparted to the plate spring portion 36E. This enables, for example, the pair of side plate portions 36C, 36D to be prevented from buckling due to compressional force.

In the cushion pan 30, the pair of side plate portions 36C, 36D extend in the seat up-down direction when viewed from a direction (the seat front-rear direction) orthogonal to the opposing direction of the pair of horizontal portions 36A, 36B and the seat up-down direction. This enables a length L (see FIG. 5) of the plate spring portion 36E in the opposing direction of the pair of horizontal portions 36A, 36B (the seat left-right direction) to be made longer than in configurations in which the pair of side plate portions 36C, 36D are inclined so as to approach each other on progression toward the plate spring portion 36E side when viewed from the above orthogonal direction. Thereby, utilizing the ductility of plate spring portion 36E, the plate spring portion 36E is made to flex more easily.

The cushion pan 30 is moreover configured by joining the plate spring member 36 and the frame member 34 together. The cushion pan 30 can therefore be manufactured by pressing the plate spring member 36 and the frame member 34 separately from each other. Press-manufacture is accordingly even easier.

Figure 7:
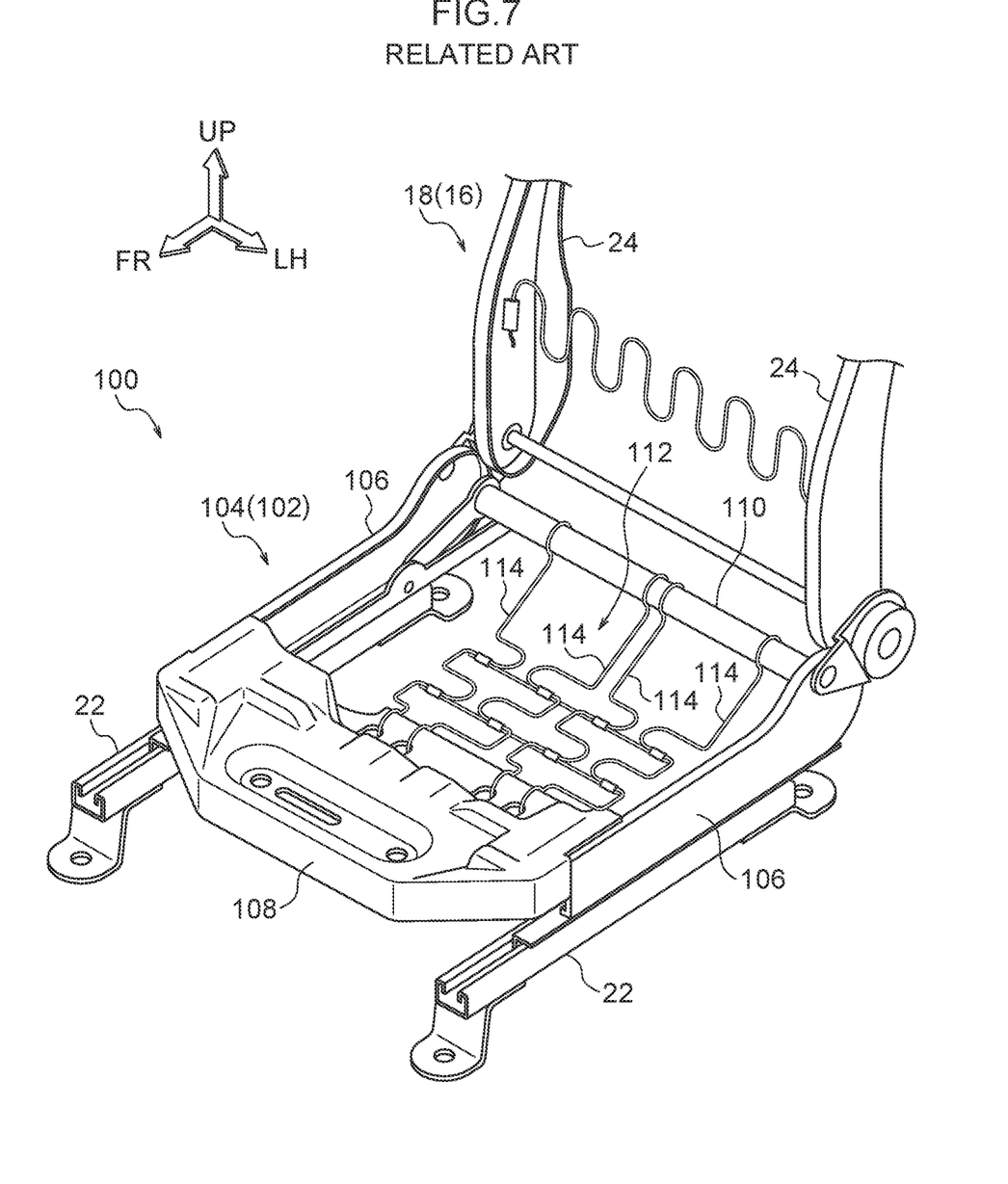
FIG. 7 is a perspective view corresponding to FIG. 1, illustrating a frame of a vehicle seat according to a first comparative example.
Figure 9:
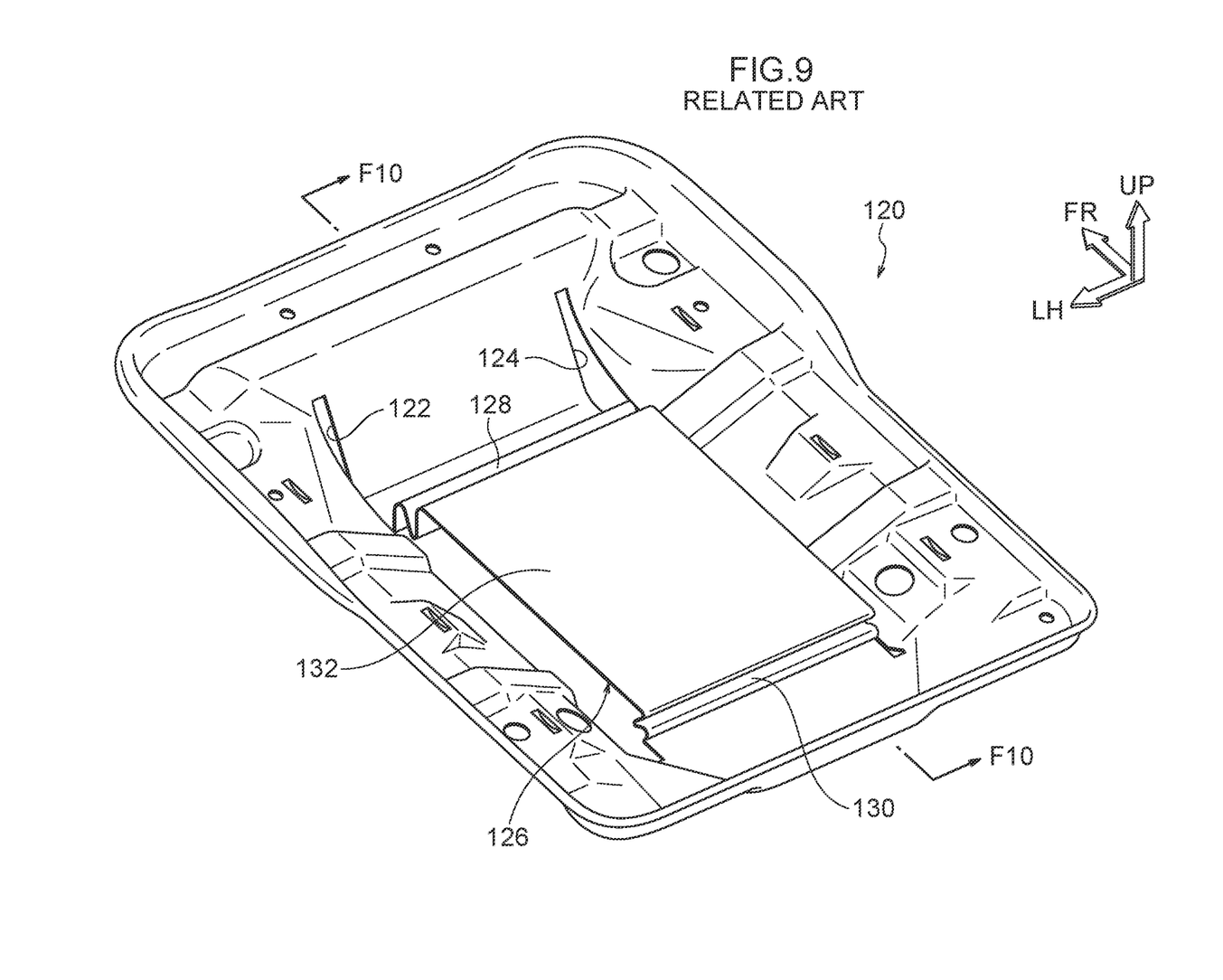
FIG. 9 is a perspective view illustrating a cushion pan according to a second comparative example, in a state as viewed from the seat rear side, diagonally above and to the left.
Figure 10:
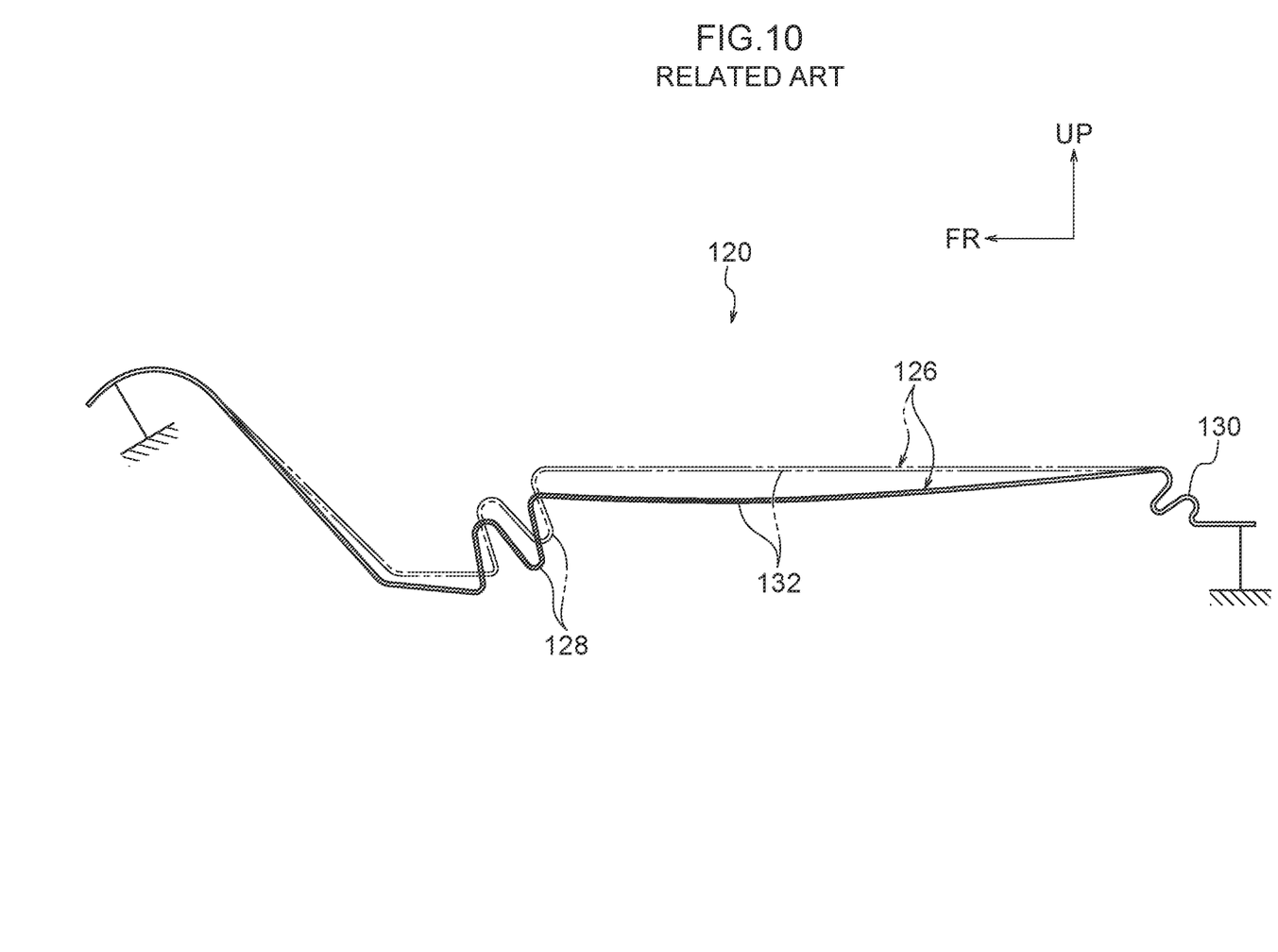
FIG. 10 is an enlarged cross-section illustrating an enlarged cross-section taken along line F10-F10 in FIG. 9, in a state in which downward load has been imparted to a cushion pan according to the second comparative example.
Figure 11:
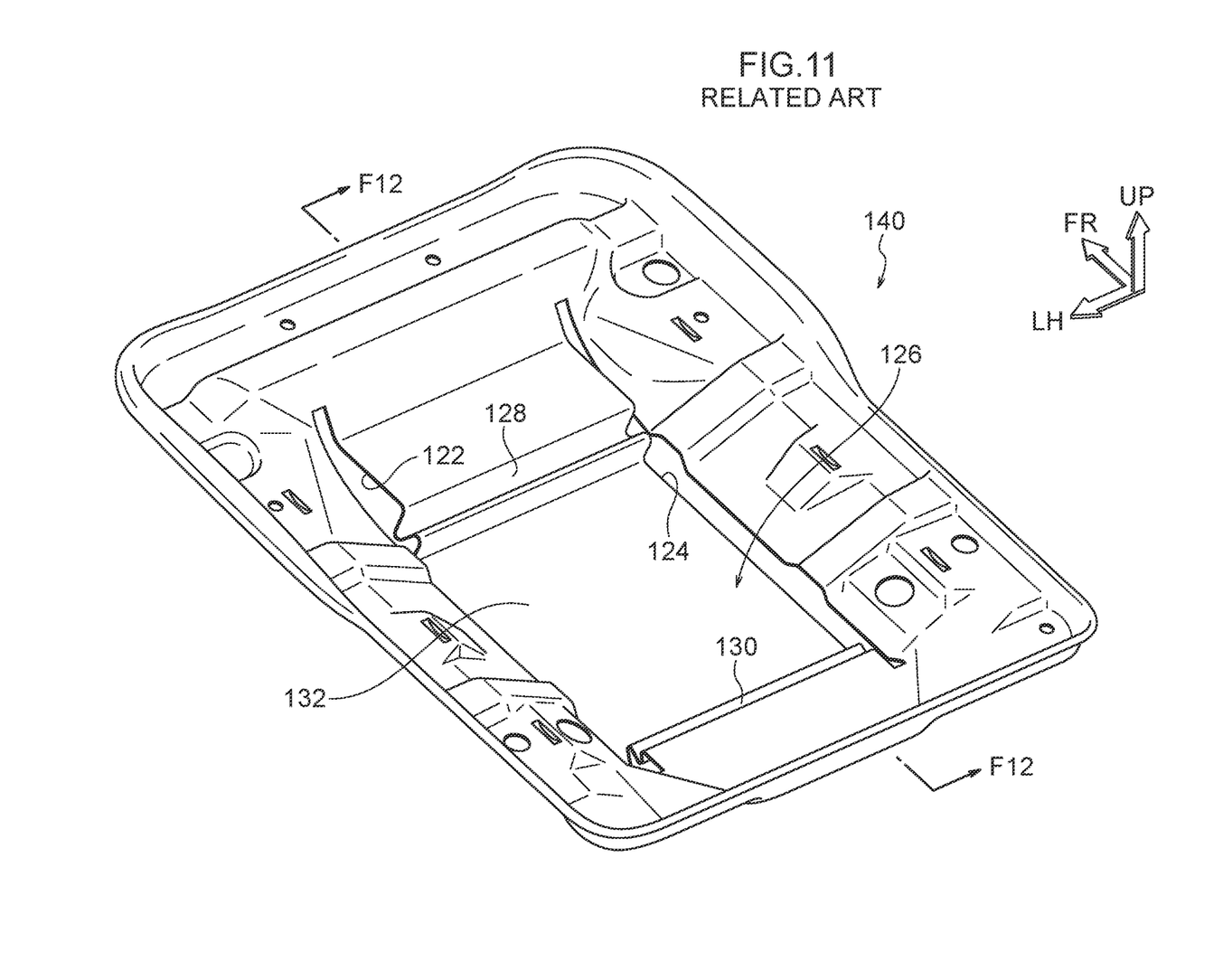
FIG. 11 is a perspective view illustrating a cushion pan according to a third comparative example, in a state as viewed from the seat rear side, diagonally above and to the left.
Figure 12:
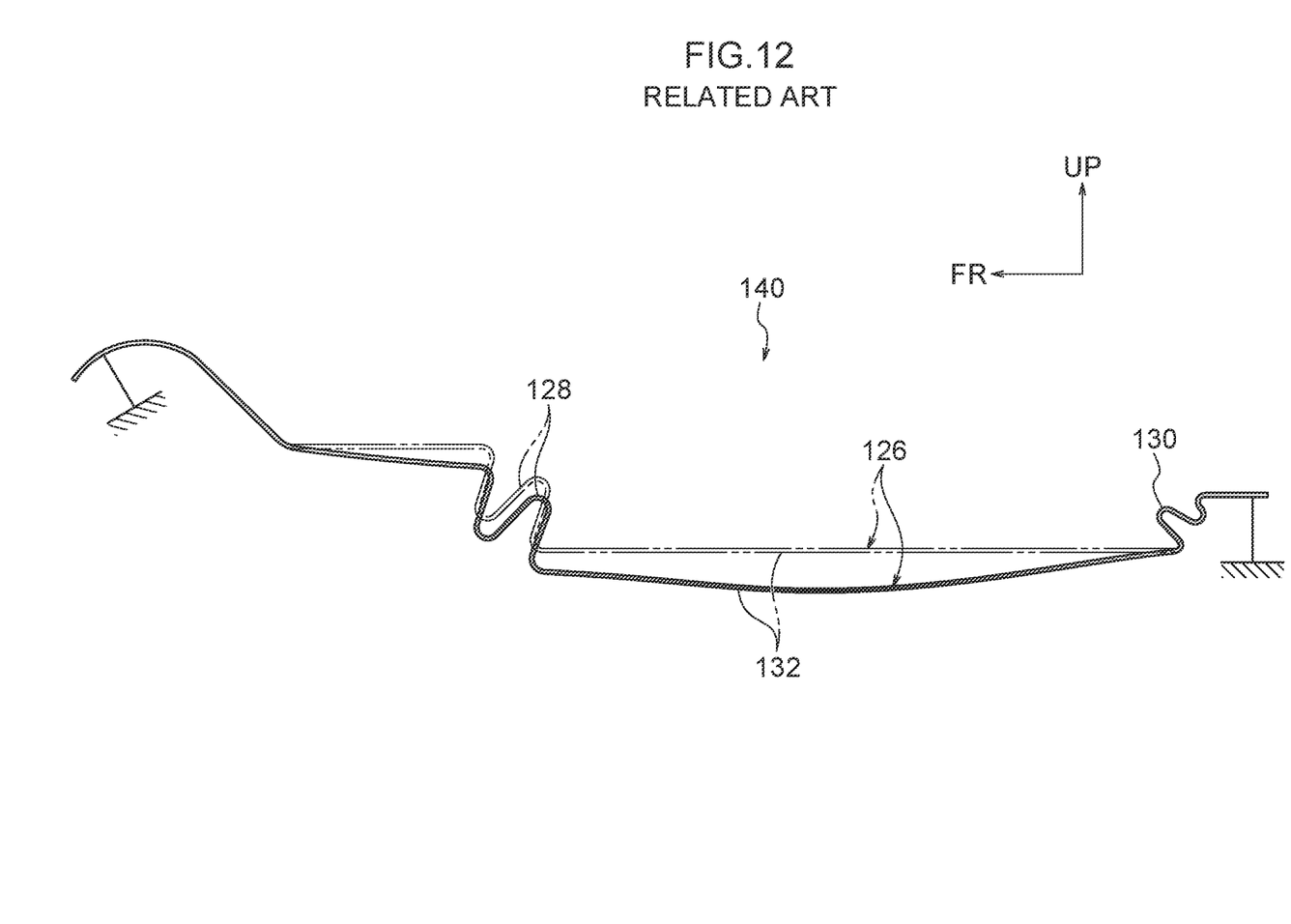
FIG. 12 is an enlarged cross-section illustrating an enlarged cross-section taken along line F12-F12 in FIG. 11, in a state in which downward load has been imparted to a cushion pan according to the third comparative example.

Supplementary explanation follows regarding the advantageous effects of the cushion pan 30 according to the present exemplary embodiment, with reference to a first comparative example illustrated in FIG. 7, a second comparative example illustrated in FIG. 9 and FIG. 10, and a third comparative example illustrated in FIG. 11 and FIG. 12.

As illustrated in FIG. 7, in a vehicle seat 100 according to the first comparative example, a seat cushion frame 104 of a seat cushion 102 includes left and right side frames 106, a pan frame 108 bridging between front end portions of the left and right side frames 106, and a rear frame 110 bridging between rear end portions of the left and right side frames 106. An ordinary seat cushion spring 112 configured including plural (herein, four) formed wires 114 bridges between the pan frame 108 and the rear frame 110. The formed wires 114 are configured by coating what are known as S-springs with a resin. Note that in FIG. 7, the same reference signs are allocated to configuration similar to that of the present exemplary embodiment.

Figure 8:
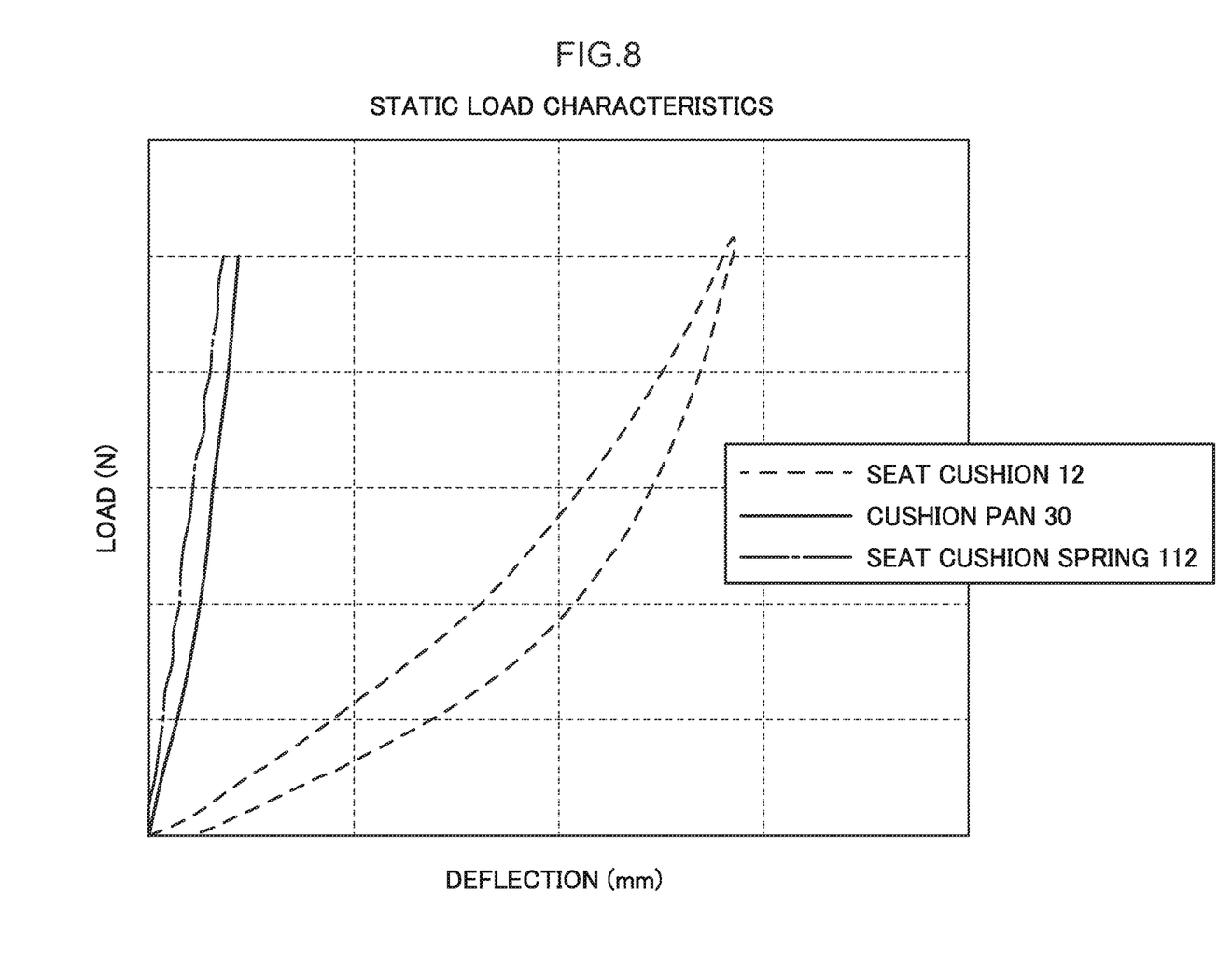
FIG. 8 is a graph illustrating static load characteristics of a seat cushion spring of a vehicle seat according to a first comparative example, and of a cushion pan according to an exemplary embodiment.

Moreover, FIG. 8 is a graph illustrating static load characteristics of the seat cushion spring 112 configured as described above, and the cushion pan 30 according to the present exemplary embodiment. The static load characteristics are those obtained by the following static load tests. Namely, the seat cushion 12 of the vehicle seat 10 according to the present exemplary embodiment, and the seat cushion 102 according to the first comparative example, are prepared to the state of a finished product. A loading jig modeling the bottom of a person was placed on the seating faces of the seat cushions 12, 102, downward load was applied to the loading jig, and the respective deflections of the seat cushion spring 112 and the cushion pan 30 toward the seat lower side were measured. Note in FIG. 8, the load-deflection curve of the finished product of the seat cushion 12 is indicated by a broken line.

As illustrated in FIG. 8, the cushion pan 30 according to the present exemplary embodiment exhibits deflection characteristics similar to those of the seat cushion spring 112 of the first comparative example. It was confirmed by these static load tests that the cushion pan 30 according to the present exemplary embodiment is able to realize ride comfort similar to that of the ordinary seat cushion spring 112 configured including the plural formed wires 114.

Moreover, the cushion pan 30 according to the present exemplary embodiment was also compared against a second comparative example as illustrated in FIG. 9 and FIG. 10 and a third comparative example illustrated in FIG. 11 and FIG. 12 using computer analysis. In a cushion pan 120 according to the second comparative example (FIG. 9 and FIG. 10), similarly to the seat pad support body described above in Background Art, cutout grooves (slits) 122, 124 are formed so as to mutually oppose each other, and a region between the two slits 122, 124 configures a swing section 126. Flexible portions 128, 130 having substantially W-shaped cross-sections (substantially S-shaped cross-sections) are formed at each of the respective two ends of the swing section 126. A flat plate shaped horizontal sheet portion 132 is configured so as to bridge between upper end portions of the flexible portions 128, 130. A cushion pan 140 according to the third comparative example (FIG. 11 and FIG. 12) is configured similarly to the cushion pan 120 according to the second comparative example, except for the horizontal sheet portion 132 bridging between the lower end portions of the flexible portions 128, 130.

Then, in a computer analysis, downward load was applied to the horizontal sheet portion 132 with the front and rear two ends of the cushion pans 120, 140 supported. The results thereof confirmed that the flexible portions 128, 130 barely flex. Note that in FIG. 10 and FIG. 12, similarly to in FIG. 6, the stress arising is illustrated using a grey scale, with darker locations indicating greater stress. This computer analysis confirmed that, for cushion pans formed from metal sheets, deflection is more readily obtained by setting the length L for the horizontal sheet portion (the plate spring portion 36E) longer than by providing the flexible portions 128, 130 as described above.

As explained above, in the cushion pan 30 and the vehicle seat 10 equipped with the cushion pan 30 according to the present exemplary embodiment, good ride comfort can be secured for a seated person, and press-manufacture is easy.

Supplementary Explanation Regarding Exemplary Embodiments

Figure 13:
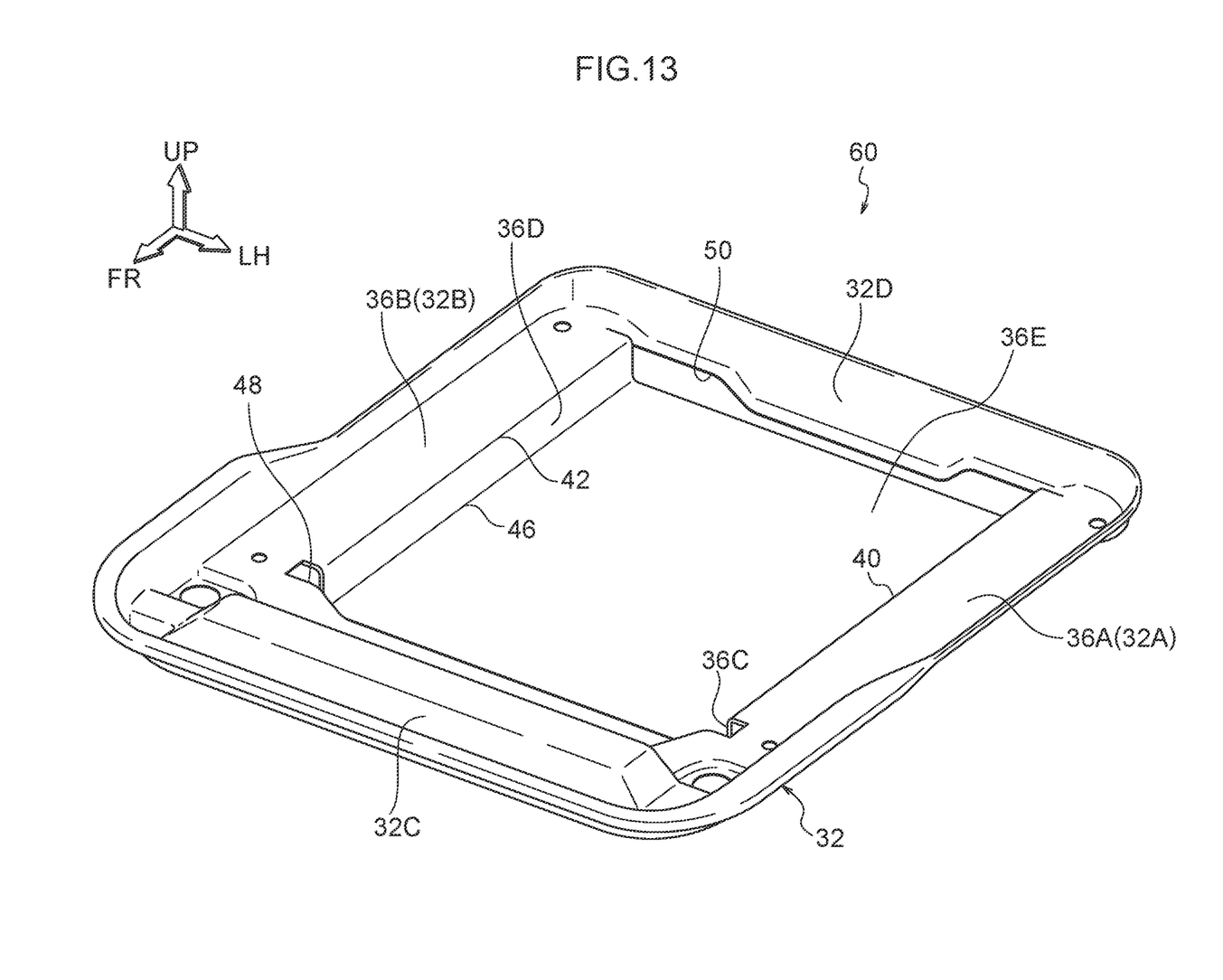
FIG. 13 is a perspective view corresponding to FIG. 3, illustrating a first modified example of a cushion pan according to an exemplary embodiment.
Figure 14:
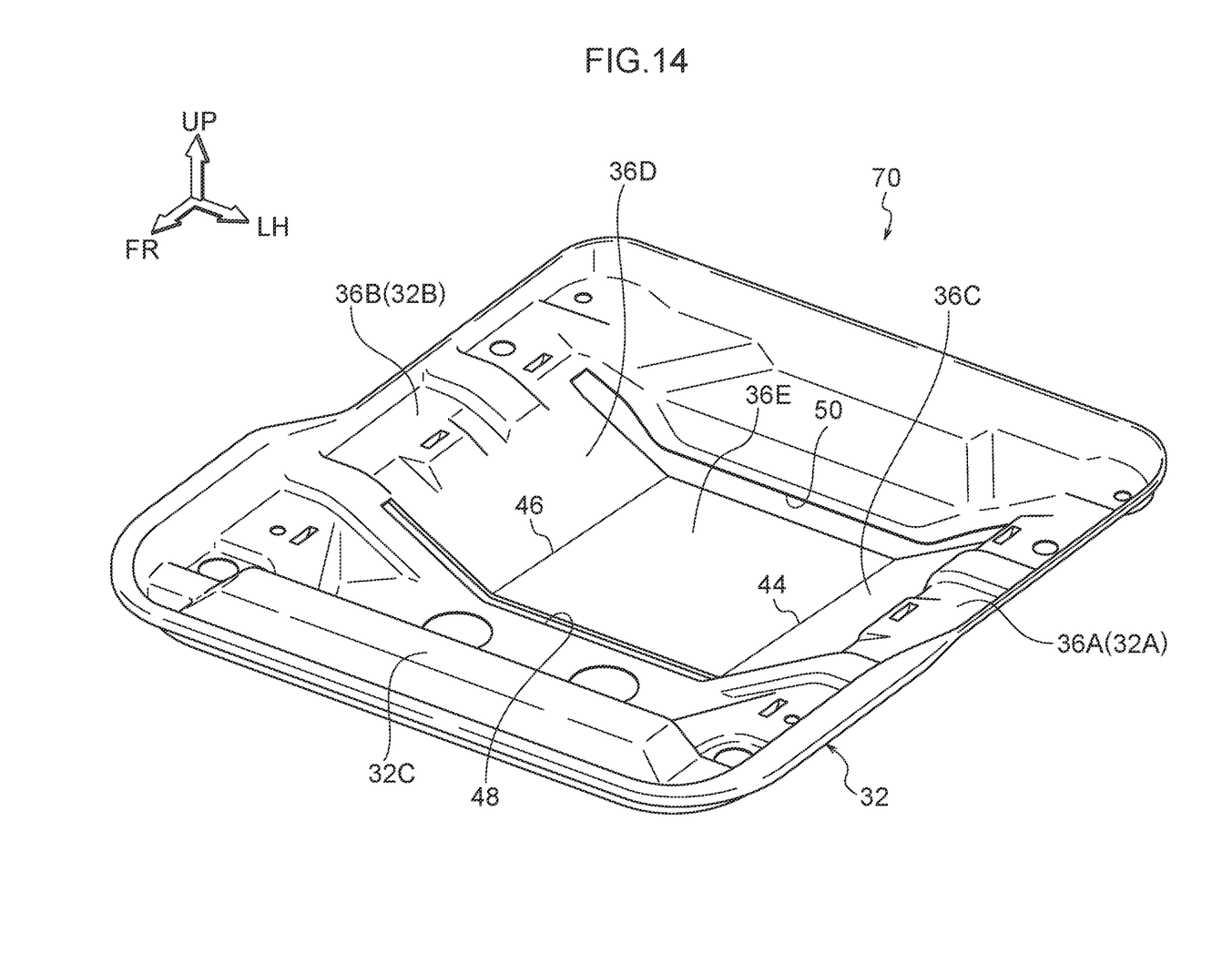
FIG. 14 is a perspective view corresponding to FIG. 3, illustrating a second modified example of a cushion pan according to an exemplary embodiment.

The cushion pan 30 according to the above exemplary embodiment is configured by joining together the frame member 34 and the plate spring member 36 that have been pressed separately. However, the present disclosure is not limited thereto, and a configuration may be adopted in which the cushion pan 30 is formed as a single body using a single metal sheet, as in a cushion pan 60 (first modified example) illustrated in FIG. 13, or a cushion pan 70 (second modified example) illustrated in FIG. 14. In these cushion pans 60, 70, the pair of horizontal portions 36A, 36B configuring left and right sides 32A, 32B of the outer frame section 32 are connected to front and rear sides 32C, 32D so as to form a single body.

Moreover, although in the above exemplary embodiment the pair of side plate portions 36C, 36D are configured so as to extend in the seat up-down direction, as viewed from a direction (the seat front-rear direction) orthogonal to the opposing direction of the pair of horizontal portions 36A, 36B and to the seat up-down direction, the present disclosure is not limited thereto. As in the cushion pan 70 illustrated in FIG. 14, the pair of side plate portions 36C, 36D may be configured inclined so as to approach each other on progression toward the plate spring portion 36E side when viewed from the above orthogonal direction.

Moreover, although the above exemplary embodiment is configured with the pair of side plate portions 36C, 36D formed in flat plate shapes, the present disclosure is not limited thereto. It is sufficient that the pair of side plate portions 36C, 36D extend overall toward one side in the seat up-down direction, and the cross-section of the pair of side plate portions 36C, 36D may have a gentle, circular arc shaped curve.

Moreover, although the above exemplary embodiment is configured with the pair of side plate portions 36C, 36D extending toward the seat lower side from the facing end portions of the pair of horizontal portions 36A, 36B, the present disclosure is not limited thereto. The pair of side plate portions 36C, 36D may be configured so as to extend toward the seat upper side from the facing end portions of the pair of horizontal portions 36A, 36B.

Moreover, although the above exemplary embodiment is configured with the pair of side plate portions 36C, 36D and the plate spring portion 36E bridging between the left and right sides 32A, 32B of the outer frame section 32, the present disclosure is not limited thereto. A configuration may be adopted in which the pair of side plate portions 36C, 36D and the plate spring portion 36E bridge between the front and rear sides 32C, 32D of the outer frame section 32. In such cases, configuration is such that the front-rear and left-right relationships are swapped with respect to the above exemplary embodiment, and the pair of horizontal portions 36C, 36D are provided to the front and rear sides 32C, 32D.

Various other modifications may be made to the present disclosure within a range not departing from the spirit thereof. Moreover, the scope of rights of the present disclosure is not limited to the above exemplary embodiments.

A first aspect of the present disclosure is a cushion pan for a seat cushion. The cushion pan is formed from a metal sheet and the cushion pan comprises: an outer frame section that is formed in a frame shape in a seat plan view, a pair of mutually opposing sides of the outer frame section each including a horizontal portion with a respective thickness direction along a seat up-down direction; a pair of side plate portions that extend toward one side in the seat up-down direction from facing end portions of the pair of horizontal portions; and a plate spring portion having a flat plate shape bridging between ends of the pair of side plate portions on an opposite side of the side plate portions from the pair of horizontal portions.

The cushion pan of the first aspect is formed from a metal sheet and includes the outer frame section that is formed in a frame shape in a seat plan view. The pair of mutually opposing sides of the outer frame section each include a horizontal portion with its thickness direction along the seat up-down direction. The pair of side plate portions extend toward one side in the seat up-down direction from facing end portions of the pair of horizontal portions. The flat plate shaped plate spring portion bridges between ends of the pair of side plate portions on the opposite side of the side plate portions to the pair of horizontal portions. In such a cushion pan, the ductility of the plate spring portion enables the plate spring portion to flex when load from a seated person is imparted downward. Good ride comfort can thereby be secured for the seated person. Moreover, for example, the locations corresponding to the pair of horizontal portions, the pair of side plate portions, and the plate spring portion may be pressed so as to have a hat-shaped profile in cross-section, and there is no need to form a flexible portions having a substantially U-shaped profile in cross-section or a substantially W-shaped profile in cross-section. Thus, press-manufacture thereof is easy.

A second aspect of the present disclosure is a cushion pan of the first aspect. The pair of side plate portions extend toward a seat lower side from the facing end portions of the pair of horizontal portions.

In the cushion pan of the second aspect, the pair of side plate portions extend toward the seat lower side from the facing end portions of the pair of horizontal portions configuring the pair of sides of the outer frame section, and the plate spring portion bridges between lower end portions of the pair of side plate portions. Thus, tensile force acts on the pair of side plate portions when the load from the seated person is imparted to the plate spring portion. This enables, for example, the pair of side plate portions to be prevented from buckling due to compressional force.

A third aspect of the present disclosure is a cushion pan of the first aspect. The pair of side plate portions extend in the seat up-down direction in a case in which the pair of side plate portions are viewed in a direction orthogonal to the opposing direction of the pair of horizontal portions and to the seat up-down direction.

In the cushion pan of the third aspect, due to being configured as described above, the length of the plate spring portion in the opposing direction of the pair of horizontal portions (the sides) can be made longer than in configurations in which the pair of side plate portions are inclined so as to approach each other on progression toward the plate spring portion side when viewed from the above orthogonal direction. Thereby, utilizing the ductility of plate spring portion 36E, the plate spring portion 36E is made to flex more easily.

A fourth aspect of the present disclosure is a cushion pan of the first aspect. A plate spring member that includes all of the pair of horizontal portions, the pair of side plate portions, and the plate spring portion; and a frame member formed in a frame shape in seat plan view and including a pair of mutually opposing sides are further included. The pair of horizontal portions included in the plate spring member and the pair of sides included in the frame member are joined together to configure the pair of sides configuring the outer frame section.

The cushion pan of the fourth aspect includes the plate spring member formed by the single body configured from the pair of horizontal portions, the pair of side plate portions, and the plate spring portion, and the cushion pan includes the frame member formed in a frame shape in seat plan view. The pair of sides configuring the outer frame section is configured by joining together a pair of flange portions configuring the plate spring member and the pair of sides configuring the frame member. Namely, the cushion pan is configured by joining together the plate spring member and the frame member, enabling manufacture by pressing the plate spring member and the frame member separately. This makes press-manufacture thereof even easier.

A fifth aspect of the present disclosure is a vehicle seat. The vehicle seat has a seat cushion frame that includes a left and right pair of side frames arranged at portions on left and right sides of a seat cushion; and the cushion pan of the first aspect. The outer frame section of the cushion pan is supported by the pair of side frames.

In the vehicle seat of the fifth aspect, the cushion pan is supported by the pair of left and right side frames arranged at the portions on the left and right sides of the seat cushion. This cushion pan is able to obtain similar advantageous effects to those of any one of the first to the fourth aspects due to this cushion pan being the cushion pan of any one of the first to the fourth aspects.

As described above, the cushion pan and vehicle seat according to the present disclosure enable good ride comfort to be secured for a seated person, and can be press-manufactured easily.

What is claimed is:

1. A cushion pan for a seat cushion, the cushion pan being formed from a metal sheet and the cushion pan comprising:

an outer frame section that is formed in a frame shape in a seat plan view, a pair of mutually opposing sides of the outer frame section each side including a horizontal portion with a respective thickness direction along a seat up-down direction;

a pair of side plate portions that extend toward one side in the seat up-down direction from facing end portions of the pair of horizontal portions; and a plate spring portion having a flat plate shape bridging between ends of the pair of side plate portions on an opposite side of the side plate portions from the pair of horizontal portions, wherein a plate spring member comprises the pair of horizontal portions, the pair of side plate portions, and the plate spring portion;

a frame member formed in the frame shape in seat plan view includes a first pair of mutually opposing sides and a second pair of mutually opposing sides, the pair of horizontal portions included in the plate spring member and the first pair of mutually opposing sides included in the frame member are joined together to configure the pair of mutually opposing sides of the outer frame section, and a slit is formed between each of the second pair of mutually opposing sides and the plate spring member so as to make no connection therebetween.

2. The cushion pan of claim 1, wherein the pair of side plate portions extend toward a seat lower side from the facing end portions of the pair of horizontal portions.

3. The cushion pan of claim 1, wherein the pair of side plate portions extend in the seat up-down direction in a case in which the pair of side plate portions are viewed in a direction orthogonal to the opposing direction of the pair of horizontal portions and to the seat up-down direction.

4. A vehicle seat having a seat cushion frame comprising:

a left and right pair of side frames arranged at portions on left and right sides of a seat cushion; and the cushion pan of claim 1, the outer frame section of the cushion pan being supported by the pair of side frames.

\* \* \* \* \*